United States Patent
Fathpour et al.

(10) Patent No.: US 10,718,904 B2
(45) Date of Patent: Jul. 21, 2020

(54) THIN-FILM INTEGRATION COMPATIBLE WITH SILICON PHOTONICS FOUNDRY PRODUCTION

(71) Applicant: UNIVERSITY OF CENTRAL FLORIDA RESEARCH FOUNDATION, INC., Orlando, FL (US)

(72) Inventors: Sasan Fathpour, Orlando, FL (US); Amirmahdi Honardoost, Orlando, FL (US); Saeed Khan, Orlando, FL (US)

(73) Assignee: UNIVERSITY OF CENTRAL FLORIDA RESEARCH FOUNDATION, INC., Orlando, FL (US)

( * ) Notice: Subject to any disclaimer, the term of this patent is extended or adjusted under 35 U.S.C. 154(b) by 100 days.

(21) Appl. No.: 15/932,800

(22) Filed: Apr. 26, 2018

(65) Prior Publication Data

US 2018/0314004 A1 Nov. 1, 2018

Related U.S. Application Data

(60) Provisional application No. 62/490,106, filed on Apr. 26, 2017.

(51) Int. Cl.
*G02B 6/132* (2006.01)
*G02B 6/122* (2006.01)
*G02B 6/12* (2006.01)

(52) U.S. Cl.
CPC .......... *G02B 6/132* (2013.01); *G02B 6/12002* (2013.01); *G02B 6/12004* (2013.01); *G02B 6/1228* (2013.01); *G02B 2006/1204* (2013.01); *G02B 2006/12061* (2013.01); *G02B 2006/12097* (2013.01); *G02B 2006/12142* (2013.01); *G02B 2006/12188* (2013.01)

(58) Field of Classification Search
CPC .. G02B 6/132; G02B 6/12002; G02B 6/1228; G02B 6/12004; G02B 2006/12061; G02B 2006/12142; G02B 2006/12097; G02B 2006/1204; G02B 2006/12188
See application file for complete search history.

(56) References Cited

U.S. PATENT DOCUMENTS 7,076,135 B2 * 7/2006 Yamada ............... G02B 6/1228
385/129

* cited by examiner

*Primary Examiner* — John Bedtelyon
(74) *Attorney, Agent, or Firm* — Klintworth & Rozenblat IP LLP

(57) ABSTRACT

A photonic integrated circuit and a method of fabrication are provided which includes: a substrate; a first optical waveguide disposed, at least in part, extending across the substrate, the first optical waveguide being configured to transmit a first mode of light; and a second optical waveguide located at least partially over the first optical waveguide, the second optical waveguide being configured to transmit a second mode of light, wherein the first optical waveguide is vertically coupled to the second optical waveguide through a third optical waveguide disposed below the second waveguide.

15 Claims, 21 Drawing Sheets

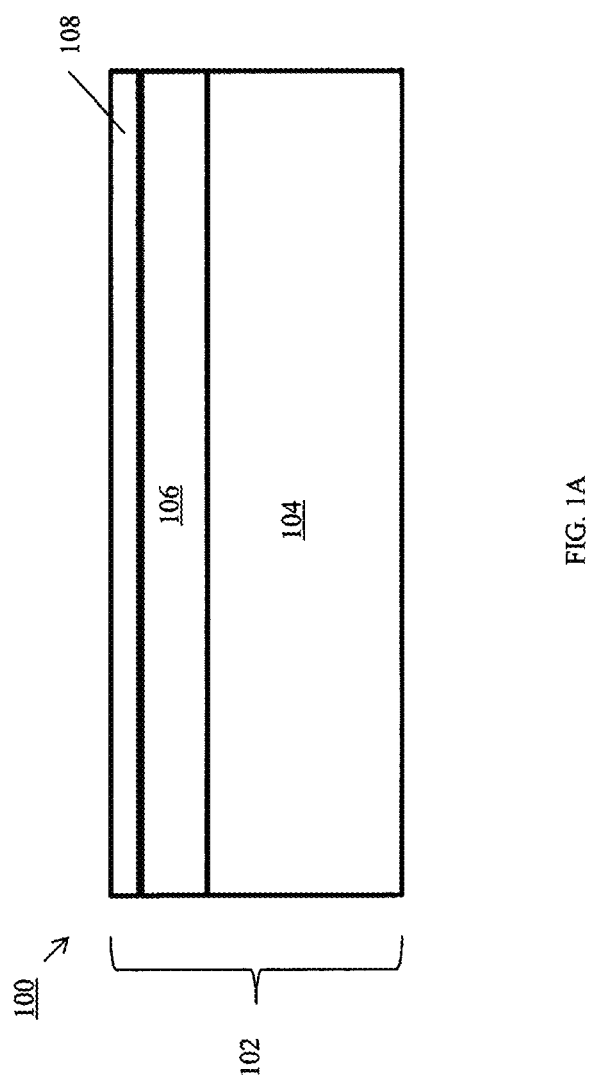

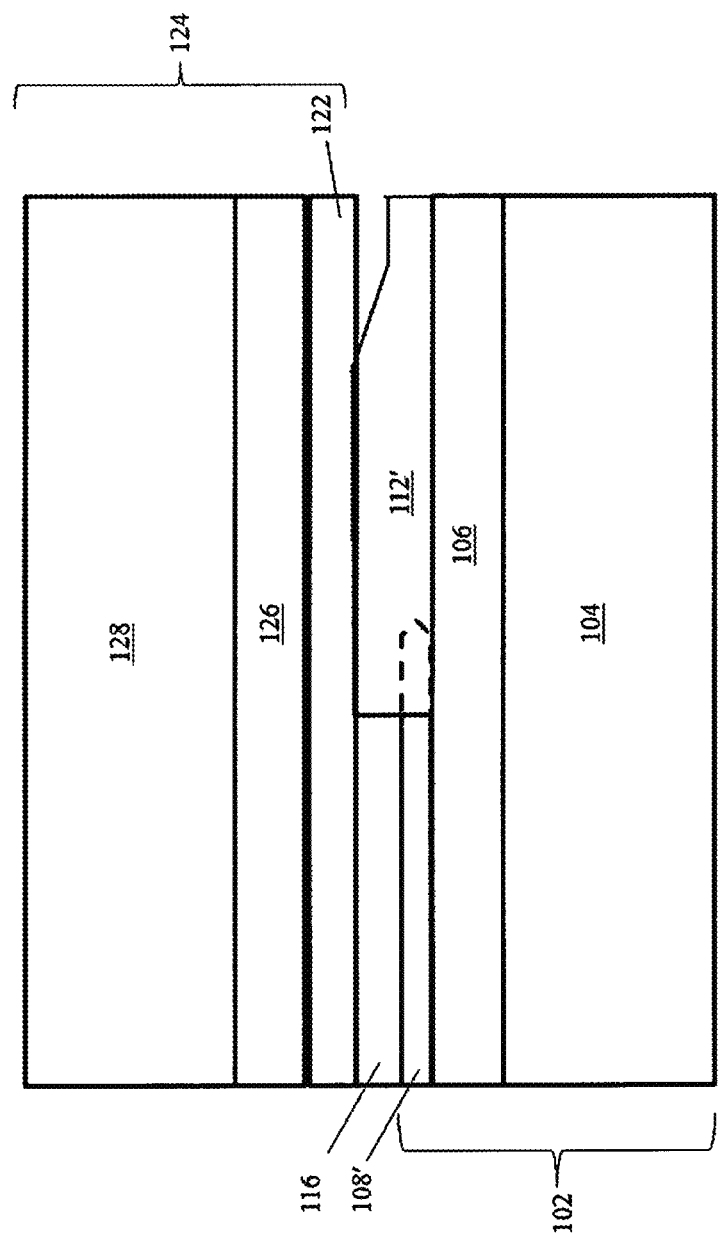

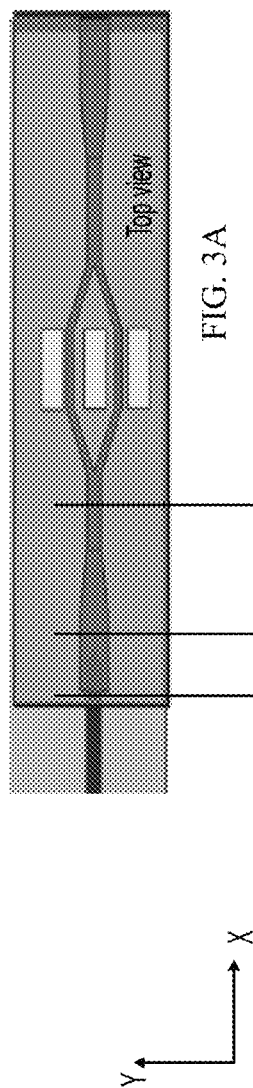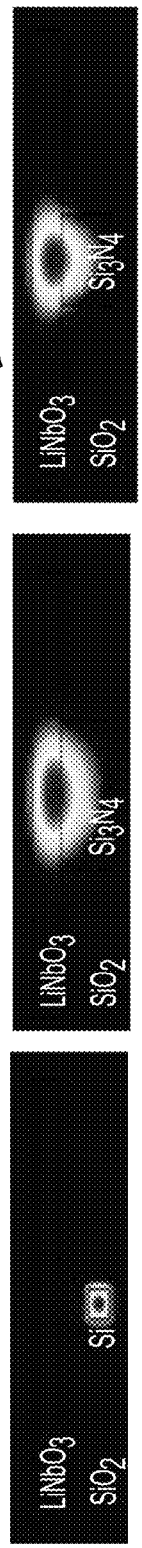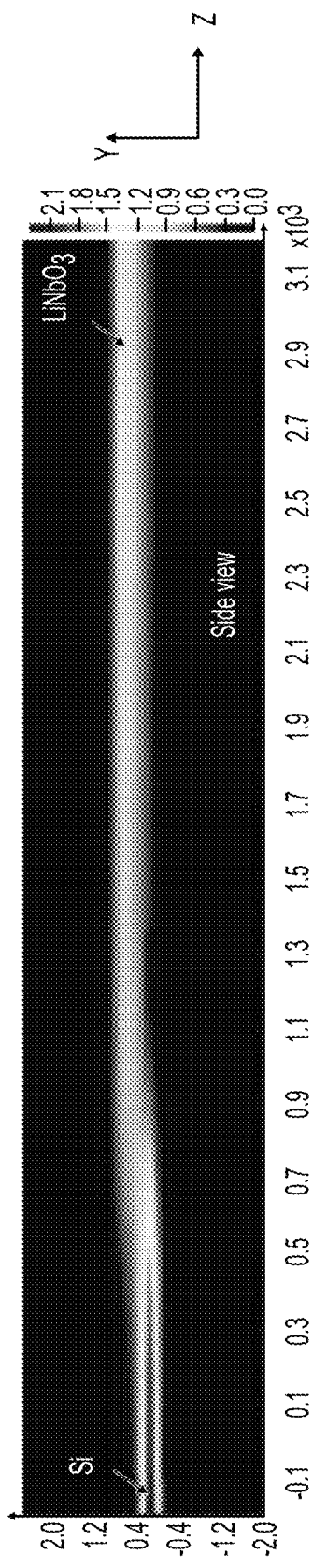
FIG. 3A
FIG. 3B
FIG. 3C
FIG. 3D
FIG. 3E

THIN-FILM INTEGRATION COMPATIBLE WITH SILICON PHOTONICS FOUNDRY PRODUCTION

CROSS-REFERENCE TO RELATED APPLICATION

The present application relates and claims priority to U.S. Provisional Patent Application Ser. No. 62/490,106, filed Apr. 26, 2017, the entirety of which is hereby incorporated by reference.

BACKGROUND OF THE INVENTION

1. Field of the Invention

The invention relates generally to the field of photonics, and more particularly, to a photonics integrated circuit, and a method of fabrication thereof.

2. Description of Related Art

Photonic integrated circuits which, for instance, include analog and/or digital photonic circuits that are integrated with electronic devices, and foundries that fabricate such photonic integrated circuits have extensively been developed in recent years. Standard device libraries have been widely used in different digital and analog communication applications, as well as optical sensors, non-linear optical devices and quantum photonic applications. As understood, while conventional modulators suffer from either bulkiness (as in the case of lithium niobate modulators) or low modulation depth (as in the case of silicon), analog photonic applications require high-quality optical signals with low-noise, high signal-to-noise ratio, and wide bandwidth.

As one skilled in the art will understand, lithium niobate (LN or $LiNbO_3$) modulators are extensively used in analog photonic circuits. By way of example, single-crystalline lithium niobate has several advantages relative to those of other conventional materials. These advantages include, but are not limited to, a wide transparency wavelength window (i.e., about 0.4 to 5 μm), large electro-optic coefficient (e.g., r33=31 pm/V and r13=8 pm/V), large intrinsic bandwidth, and absence of two-photon absorption effect. Owing to its advantages, lithium niobate has been extensively used for a variety of applications within the ultraviolet (UV) to the mid-infrared region. Further, standard lithium niobate waveguides are widely regarded as the best vehicle for electro-optic (EO) modulation in the analog photonics with impressively high modulation bandwidths (i.e., up to 100 GHz).

Conventional lithium niobate waveguides are traditionally formed by diffusion of titanium employing, for instance, the process of annealed proton exchange or implantation of dopants (e.g., oxygen ions) in bulk wafers. Disadvantageously, any of these processes can only slightly alter the refractive index of the material, i.e., the index contrast of the obtained diffused waveguides is rather small (i.e., $\Delta n=0.1$ to about $\Delta n=0.2$), and hence the guided optical modes are weakly confined. Hence it is not possible to make micro-ring modulator using diffusion based devices. Also the weak confinement of the light leads to large device cross-sections (i.e., widths of several microns) and hence large half-voltage length-product, (for instance, Vπ·L, of about 10 to about 20 V·cm depending on modulation frequency and characteristic impedance). This, in turn, requires long modulation electrodes that limit the maximum bandwidth of optical modulators. Typically, several centimeter-long electrodes are usually needed to achieve low voltage, which cause many problems for very high speed modulators. These problems include phase mis-match between RF field and optical field and metal loss, due to skin effect at very high speeds. These problems limit the performance of optical modulators made with lithium niobate to 100 GHz. High speed modulators that operate beyond 100 GHz are not known to exist in literature.

Therefore, there is a need for further enhancements in fabrication of integrated optical devices, for instance, based on lithium niobate, to provide enhanced performance and commercial advantage.

SUMMARY OF THE INVENTION

Provided herein, in one or more aspects, is a photonic integrated circuit which includes, for instance: a substrate; a first optical waveguide disposed, at least in part, extending across the substrate, the first optical waveguide being configured to transmit a first mode of light; and a second optical waveguide located at least partially over the first optical waveguide, the second optical waveguide being configured to transmit a second mode of light, wherein the first optical waveguide is vertically coupled to the second optical waveguide through a third optical waveguide disposed below the second optical waveguide.

According to an embodiment, the first optical waveguide comprises a rib-loaded first optical waveguide having a tapered end, wherein the tapered end of the first optical waveguide is disposed, at least in part, within the third optical waveguide.

According to an embodiment, the third optical waveguide is configured to transmit a third mode of light, wherein the tapered end of the first optical waveguide facilitates transitioning the first mode of light from the first optical waveguide to the adjoining third optical waveguide.

According to an embodiment, the photonic integrated circuit further comprises an isolation layer disposed over an exposed portion of the first optical waveguide, wherein the isolation layer, at least in part, separates the exposed portion of the first optical waveguide from the overlying second optical waveguide.

According to an embodiment, an upper surface of the isolation layer is, at least in part, substantially planar with an upper surface of the second optical waveguide.

According to an embodiment, the third optical waveguide comprises a rib-loaded third optical waveguide having at least one tapered portion, the third optical waveguide extending across a remaining portion of the substrate, wherein the at least one tapered portion of the third optical waveguide defines an optical mode distribution within the overlying second optical waveguide.

According to an embodiment, a tapered portion of the at least one tapered portion of the rib-loaded third optical waveguide is linearly aligned with the tapered end of the first optical waveguide.

According to an embodiment, at least one of the at least one tapered portion of the third optical waveguide has a width that is greater than a width of the tapered end of the first optical waveguide.

According to an embodiment, a refractive index of the second optical waveguide is matched to a refractive index of the underlying third optical waveguide, the refractive index of the third optical waveguide defining the lateral confinement of the second optical waveguide.

According to an embodiment, the second optical waveguide comprises a layer of lithium niobate material, wherein the second optical waveguide has a thickness within a range of about 300 nm to about 700 nm.

According to an embodiment, the photonic integrated circuit further comprises a plurality of electrodes disposed over the second optical waveguide, wherein each of the plurality of the electrodes straddle the underlying third optical waveguide.

In another aspect of the present invention, a method for fabricating a photonic integrated circuit is provided. The fabricating includes, for instance: forming a first optical waveguide disposed, at least in part, extending laterally across a substrate, the first optical waveguide being configured to transmit a first mode of light; and disposing a second optical waveguide at least partially over the first optical waveguide, the second optical waveguide being configured to transmit a second mode of light, wherein the first optical waveguide is vertically coupled to the second optical waveguide through a third optical waveguide disposed below, and directly contacting the second optical waveguide.

Additional features and advantages are realized through the techniques of the present invention. Other embodiments and aspects of the invention are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following description taken in conjunction with the accompanying drawings in which:

FIG. 1A is a cross-sectional elevational view of an illustrative embodiment of an intermediate structure obtained during the fabrication of a photonic integrated circuit;

FIG. 1F' is a cross-sectional elevational view of the intermediate structure of FIG. 1E with a structure disposed on the optical waveguide layer;

FIG. 1G' is a cross-sectional elevational view of the intermediate structure of FIG. 1F' with the insulator layer and semiconductor layer of the structure selectively etched;

FIG. 3A is a top view of a schematic representation of a photonic integrated circuit, in accordance with one or more aspects of the present invention;

FIG. 3B is a top view of a schematic representation of an optical mode between one or more optical waveguides of the photonics integrated circuit in FIG. 3A;

FIG. 3C is another top view of a schematic representation of an optical mode between one or more optical waveguides of the photonics integrated circuit in FIG. 3A;

FIG. 3D is an additional top view of a schematic representation of an optical mode between one or more optical waveguides of the photonics integrated circuit in FIG. 3A;

FIG. 3E is a side view of a schematic representation of an optical mode between one or more optical waveguides of the photonics integrated circuit in FIG. 3A;

DETAILED DESCRIPTION OF THE INVENTION

Figure 1B:
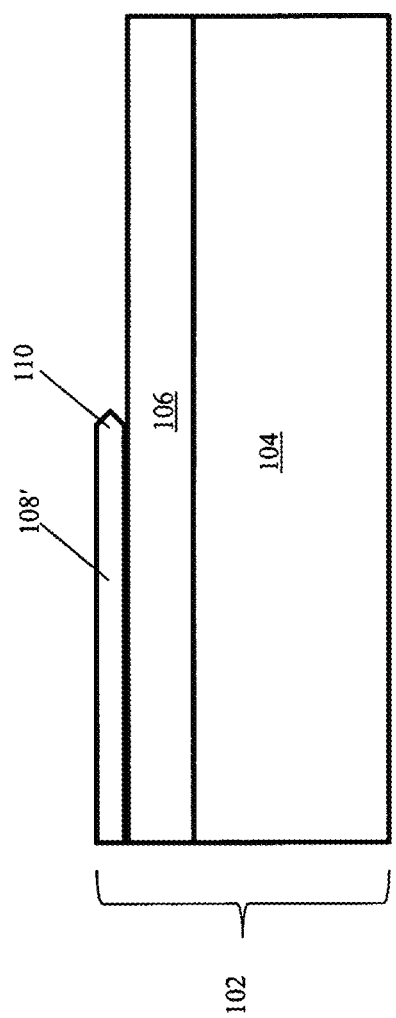
FIG. 1B is a cross-sectional elevational view of the intermediate structure of FIG. 1A with a patterned upper portion.

Aspects of the present invention and certain features, advantages, and details thereof, are explained more fully below with reference to the non-limiting examples illustrated in the accompanying drawings. Descriptions of well-known structures are omitted so as not to unnecessarily obscure the invention in detail. It should be understood, however, that the detailed description and the specific example, while indicating aspects of the invention, are given by way of illustration only, and are not by way of limitation. Various substitutions, modifications, additions, and/or arrangements, within the spirit and/or scope of the underlying inventive concepts will be apparent to those skilled in the art from this disclosure. Also, note that reference is made below to the drawings, which are not drawn to scale for ease of understanding, wherein the same reference numbers used throughout different figures designate the same or similar components.

By way of example, FIGS. 1A-1I depict one embodiment of a method for fabricating a photonic integrated circuit having one or more optical waveguides via, for instance, a back-end-of-the line fabrication processing, in accordance with one or more aspects of the present invention. Advantageously, in one embodiment, fabrication of an optical waveguide such as, for instance, a thin layer of lithium niobate has been integrated with the conventional back-end-of the line (BEOL) fabrication processing of the semiconductor (i.e., silicon-on-insulator (SOI)) wafer or chip. As depicted further below, the lithium niobate layer disclosed herein caps the silicon photonic chip and is isolated from the underlying silicon layers, via the silicon nitride layers. Further, the fabrication processes described herein can be utilized in the fabrication of devices, such as, electro-optic modulators, as well as for a variety of applications ranging from non-linear optics (e.g., second-harmonic generation) to quantum optics (e.g., spontaneous parametric down conversion).

Referring first to FIG. 1A, there is shown a cross-sectional elevational view of an intermediate structure 100 obtained during the fabrication of a photonic integrated circuit, in accordance with one or more aspects of the present invention. As depicted, intermediate structure 100 includes, for instance, a substrate 102. Substrate 102 may be, for example, a bulk semiconductor material, such as, a bulk silicon wafer. In another example, substrate 102 may be any silicon-containing substrate including, but is not limited to, silicon (Si), single crystal silicon (Si), polycrystalline Si, amorphous Si or the like. As depicted in the figures, substrate 102 may include a layered semiconductor structure, such as, for example, silicon-on-nothing (SON), silicon-on-insulator (SOI), silicon germanium-on-insulator (SiGeOI), silicon-on replacement insulator (SRI) or the like. Substrate 102 may in addition, or instead, include various isolation structures or regions, dopant regions and/or device features. Further, substrate 102 may also include other suitable elementary semiconductors, such as, for instance, germanium (Ge), or a compound semiconductor such as, silicon germanium (SiGe), SiC, SiGeC, gallium arsenide (GaAs), gallium phosphide (GaP), gallium nitride (GaN), indium arsenide (InAs), indium phosphide (InP), and/or all other III/V or II/VI compound semiconductors.

Continuing with FIG. 1A, although the layered semiconductor structure utilized in the fabrication process can extend to any of the above-described layered semiconductor structure, silicon-on-insulator (SOI) is used as a specific example to describe the fabrication process for the sake of clarity. As depicted, the layered semiconductor structure of substrate 102 may include, or may be fabricated of, for instance, a bulk silicon layer 104, an insulator layer 106 disposed over bulk silicon layer 104, and an active layer 108 (for example, a silicon layer) disposed over insulator layer 106. By way of example, the layered semiconductor structure (such as, SOI structure) of substrate 102 may be fabricated using one or more conventional implantation processes, such as, for instance, SIMOX (i.e., Separation-by-Implanted-Oxygen) process which, for instance, may involve implantation of oxygen ion(s) into a bulk silicon layer, followed by subsequent annealing processes to form insulator layer 106 that separates active layer 108 from the underlying bulk silicon layer 104. Although not critical to the invention, the thickness of each of these layers may vary according to the processing node in which the photonic integrated circuit is being fabricated. In one example, bulk silicon layer 104 may have a thickness within a range of about 300 µm to about 1000 µm, insulator layer 106 may have a thickness within a range of about 1000 nm to about 3000 nm, and the overlying silicon layer 108 may have a thickness within a range of about 180 nm to about 3000 nm. In a specific example, the thickness of the overlying active silicon layer 108 may be about 220 nm. Note that, in one embodiment, active layer 108 may include, or may be fabricated of, materials that have a refractive index (n) of about 3.42 (n for silicon (Si)=3.42–3.48). Although not critical to the invention, in another example, the refractive index of active layer 108 may also be smaller or greater than 3.42.

One or more conventional lithographic processing steps may be performed to pattern a portion of an upper portion (for example, a portion of active silicon layer 108) of substrate 102, as depicted in FIG. 1B. By way of example, the patterning of the upper portion of substrate 102 may be accomplished using any of various approaches including: direct lithography, electron beam lithography (EBL), sidewall image transfer technique, extreme ultraviolet technique (EUV); e-beam technique; litho-etch litho-etch or litho-etch litho-freeze. Following patterning, additional etching processes, such as, anisotropic dry etching processes may also be performed to remove one or more portions of the substrate. The patterning of the upper portion of substrate 102 results, in one embodiment, in a strip of silicon active layer 108' having an end that tapers laterally from a (i.e., a maximum) width of about 450 nm to 1000 nm to a minimum width of about 50 nm or less. In one embodiment, the strip of silicon layer 108' defines a rib-loaded optical waveguide that, for instance, is configured to transmit an optical mode of light.

Figure 5:
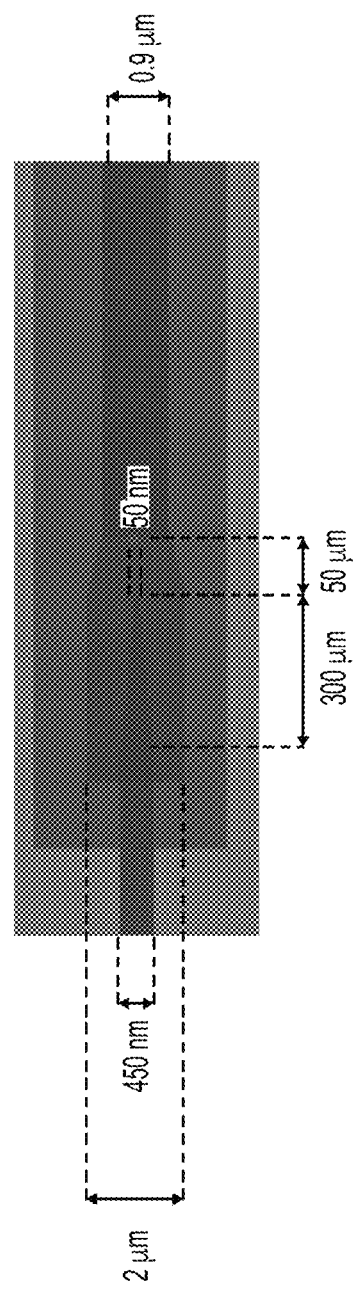
FIG. 5 is a top view of a schematic representation of an illustrative embodiment of a structure that provides dimensions of the layers of the photonic integrated circuit, in accordance with one or more aspects of the present invention.

Note that, as further depicted in FIG. 1B, such patterning of the upper portion of substrate 102 facilitates at least partially exposing insulator layer 106 thereof. Although the width of the rib-loaded optical waveguide may vary depending on the processing node in which the photonic integrated circuit is being fabricated, in one specific example, the width of the rib-loaded optical waveguide may be about 450 nm to about 1000 nm, and the length of the tapered end of the rib-loaded optical waveguide may be about 100 µm up to over 300 µm, as illustrated in FIG. 5. As one skilled in the art will understand, a rib-loaded optical waveguide provides confinement of the wave in two dimensions.

Figure 1C:
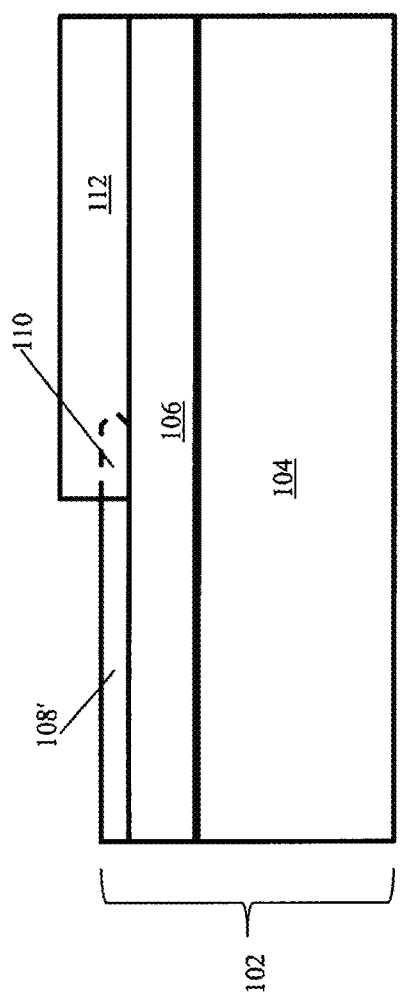
FIG. 1C is a cross-sectional elevational view of the intermediate structure of FIG. 1B with a layer of optical waveguide material disposed thereon.

Referring to FIG. 1C, a layer of optical waveguide material 112 may be disposed over a remaining portion (i.e., an exposed portion of insulator layer 104) of substrate 102. In one embodiment, optical waveguide material layer 112 may include, or may be fabricated of, glass or a high-k dielectric material with a dielectric constant k greater than about, for instance, 3.9 (note that k=3.9 for $SiO_2$), and may be deposited by performing a suitable deposition process, such as, plasma-enhanced chemical vapor deposition (PECVD), chemical vapor deposition (CVD) processes or the like. Examples of the high-k dielectric material which may be used in optical waveguide material layer 112 include, but are not limited to, silicon nitride ($Si_3N_4$ or SiN), tantalum pentoxide ($Ta_2O_5$), titanium dioxide ($TiO_2$), or the like, while the examples of glass may include, but is not limited to, chalcogenide glass or the like. Note that, in one embodiment, plasma-enhanced chemical vapor deposition (PECVD) technique is preferred in the deposition of optical waveguide material layer 112 so as to avoid incompatible thermal budget involved in other conventional processes, such as, low pressure chemical vapor deposition (LPCVD). In a specific example, optical waveguide material layer 112, such as, silicon nitride, may be deposited at a pressure of about 750 mTorr and at a temperature of about 300° C., using a mixture of about 2% silane and nitrogen, flowing at a rate of about 10 and 2000 sccm, respectively. In this example, low-frequency plasma was driven at 60 W.

Further, in one embodiment, optical waveguide material layer 112 has a refractive index that is substantially lower than the refractive index of a material of optical waveguide 108. As used herein, "substantially" refers to a refractive index of the material of the optical waveguide material layer 112 being lower than the refractive index of the material of the optical waveguide 108' by a factor of about 1.5 to about 2.5. In one example, optical waveguide material layer 112 that has a refractive index of about 2.0 may be a preferred material. In a specific example, the refractive index of silicon nitride optical waveguide material layer 112 has been found to be about 1.93 at 1550 nm, as measured using a prism-coupler commercial setup.

Continuing with FIG. 1C, optical waveguide material layer 112 may be deposited such that it extends laterally, at least in part, over optical waveguide 108', thereby encapsulating, at least in part, tapered end 110 of optical waveguide 108'. In one embodiment, optical waveguide material layer 112 may have a thickness within a range of about 300 nm to about 800 nm. In a specific example, optical waveguide material layer 112 may have a thickness of about 500 nm. Note that, in one embodiment, tapered end 110 of optical waveguide 108', advantageously, facilitate optical silicon waveguide 108' coming from the silicon photonics part of the chip to narrow down inside optical waveguide material layer 112 in order to have the mode transition, for instance, from the active silicon layer to the optical waveguide silicon nitride material layer. As understood, silicon nitride waveguides carry the optical mode to the linear modulator section on the chip or wafer.

Figure 1D:
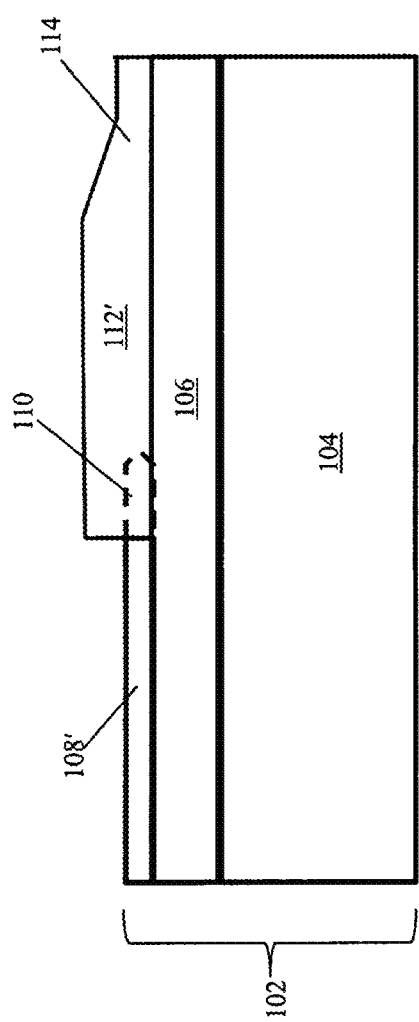
FIG. 1D is a cross-sectional elevational view of the intermediate structure of FIG. 1C after the optical waveguide material is patterned to form an optical waveguide.

Turning now to FIG. 1D, there is shown the structure of FIG. 1C after patterning of optical waveguide material layer 112 to form an optical waveguide 112' that extends laterally across the remaining portion of substrate 102, in accordance with one or more aspects of the present invention. By way of example, optical waveguide material layer 112 may be patterned using any of conventional patterning processes, such as, electron beam lithography (EBL) or the like. The patterning of optical waveguide material layer 112 results, in one embodiment, in a strip of optical waveguide material layer having a portion 114 that tapers laterally from a (i.e., a maximum) width of about 2 microns to about 0.9 microns (see also FIG. 5). In one specific example, the length of the tapered portion 114 may be about 50 microns. In one embodiment, the patterned strip of optical waveguide material layer defines a rib-loaded optical waveguide 112' that is configured to transmit an optical mode of light. As depicted, rib-loaded optical waveguide 112', encapsulates, at least in part, tapered end 110 of optical waveguide 108' and extends laterally across the remaining portion of substrate 102. Further, in one embodiment, the patterning of optical waveguide material layer 112 may be performed such that tapered end 110 of optical waveguide 108' is linearly aligned with tapered portion 114 of optical waveguide 112'. Advantageously, such a linear alignment, for instance, facilitates defining an optical mode distribution within an overlying optical waveguide that is obtained during subsequent fabrication processing. Note that, as described above, the encapsulated tapered end 110 of optical waveguide 108' facilitates transitioning the optical mode of light from optical waveguide 108' to the adjoining optical waveguide 112'.

Continuing with FIG. 1D, in an enhanced embodiment and as further discussed below, optical waveguide material layer 112 may be patterned to form optical waveguide 112' that can operate as a mode-converter for the electro-optic modulator (i.e., either as an analog modulator or a digital modulator), for instance, based on Mach-Zehnder interferometers. In such an example, optical waveguide material layer 112 may be patterned to form an input waveguide (not shown) that, for instance, tapers at least partially to branch into two optical waveguides (not shown) by way of a Y-shaped combining portion. The two optical waveguides, for instance, extend laterally across the remaining portion of substrate 102 for a desired distance and may subsequently be combined by an additional Y-shaped combining portion to mutually interfere, and eventually proceed to an output waveguide (not shown) to be outputted from an output terminal (not shown). Note that, as further described below and in one embodiment, each of the Y-shaped combining portions constitute the tapered portions of optical waveguide 112' that, for instance, are linearly aligned with tapered end 110 of optical waveguide 108', and have a width that is substantially greater than a width of the tapered end 110.

Figure 1E:
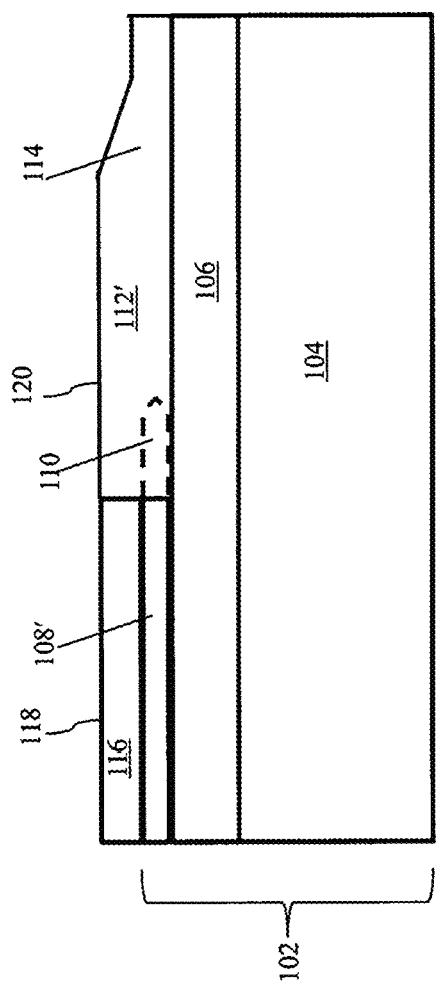
FIG. 1E is a cross-sectional elevational view of the intermediate structure of FIG. 1D with an isolation layer over an exposed portion of the waveguide.

FIG. 1E depicts the structure of FIG. 1D after deposition of an isolation layer 116 over an exposed portion of optical waveguide 108', in accordance with one or more aspects of the present invention. In one embodiment, isolation layer 116 may include, or may be fabricated of, an insulating material, such as, for instance, silicon oxide ($SiO_2$), and may be deposited using a variety of techniques, such as, for example, chemical vapor deposition (CVD), plasma-enhanced CVD or the like. The thickness of isolation layer 116 may be (in one example) sufficient to allow subsequent planarization of the structure, for instance, such that an upper surface 118 of isolation layer 116 is substantially coplanar with an upper surface 120 of optical waveguide 112', as depicted in FIG. 1E.

Figure 1F:
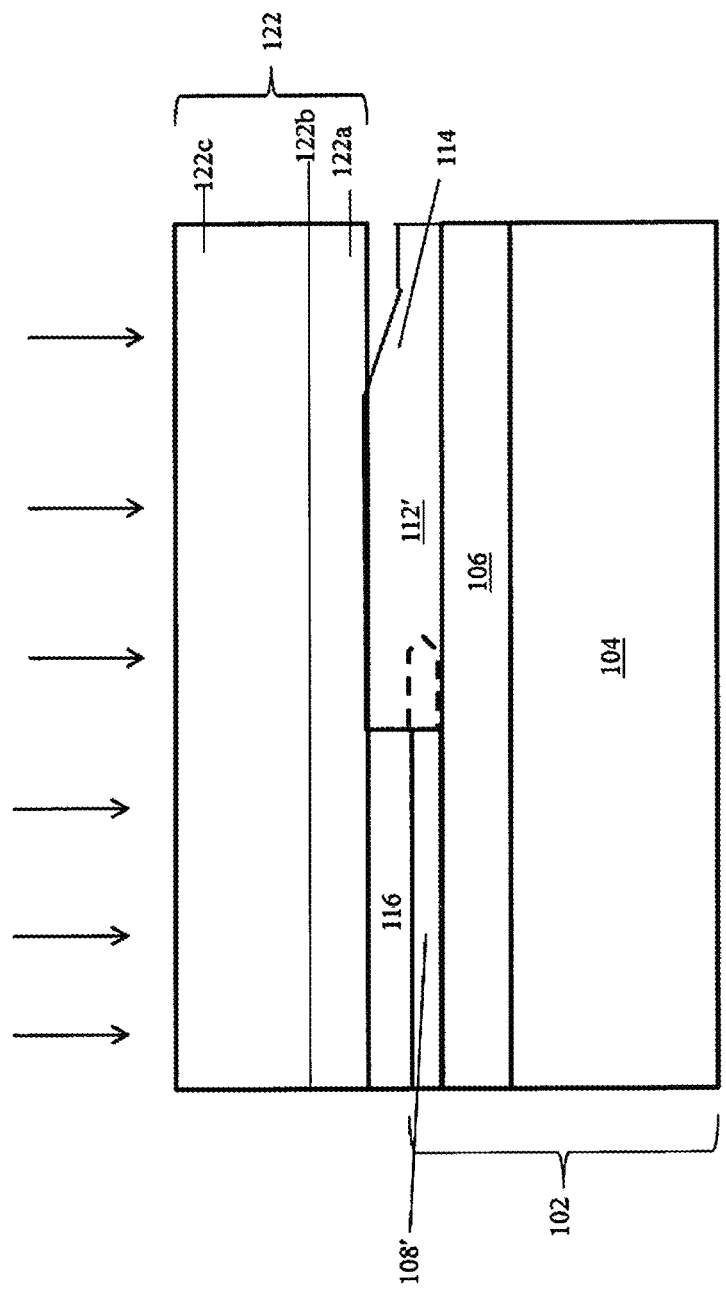
FIG. 1F is a cross-sectional elevational view of the intermediate structure of FIG. 1E with an implanted region disposed within an optical waveguide material layer.

FIG. 1F depicts the structure of FIG. 1E after forming optical waveguide material layer 122 over isolation layer 116 and optical waveguide 112', in accordance with one or more aspects of the present invention. By way of example, optical waveguide material layer 122 may be, or may include, a material such as, for instance, lithium niobate ($LiNbO_3$), aluminum nitride (AlN) and the like, and may be formed using any of conventional processes, such as, for instance, the Czochralski method, sputtering, chemical-vapor deposition and the like. Note that in one embodiment, optical waveguide material layer 122 may be selected such that its refractive index is matched to a refractive index of optical waveguide 112'. As described above, the refractive index of optical waveguide 112', advantageously, facilitates defining a lateral confinement of the resultant optical waveguide 122' (see FIG. 1H) obtained during subsequent fabrication processing.

Continuing with FIG. 1F and in one embodiment, optical waveguide material layer 122 may be subjected to an ion implantation process, prior to the formation thereof, so as to create an implanted region 122b disposed within optical waveguide material layer 122. By way of example, optical waveguide material layer 122 may be implanted with dopants, such as, hydrogen, helium or the like which, for instance, results in introducing crystal lattice defects, thereby forming implanted region 122b within optical waveguide material layer 122. As understood, the crystal lattice defects at implanted region 122b allow upper portion 122c of optical waveguide material layer 122 to be susceptible to thermal slicing processes, while portion 122a below implanted region 122b remains unaffected. As understood, ion implantation facilitates weakening a crystal lattice structure of optical waveguide material layer 122 at implanted region 122b which, for instance, allows modulating a thickness of optical waveguide material layer 122 to a desired thickness during subsequent fabrication processing. The depth of the implanted region 122b within optical waveguide material layer 122 may be modulated by modulating the process parameters, such as, implantation dose, implantation energy, etc., utilized during the ion implantation process. Although not critical to the invention, optical waveguide material layer 122 may optionally be subjected to an annealing process to achieve a desired configuration and distribution of dopants within implanted region 122b.

In an additional, or an alternate embodiment, optical waveguide material layer 122 may also be formed over isolation layer 116 and optical waveguide 112', for instance, by disposing a structure 124 onto which optical waveguide material layer 122 has been attached, as depicted in FIG. 1F. By way of example, structure 124 includes, for instance, a semiconductor substrate 128, an insulator layer 126 disposed over semiconductor layer 128, and optical waveguide material layer 122 disposed over insulator layer 126. Although not critical to the invention, semiconductor substrate 128 may include, or may be fabricated of, a semiconductor material, such as, silicon, while insulator layer 126 may include, or may be fabricated of an insulating material, such as, silicon oxide ($SiO_2$). These layers of structure 124 of FIG. 1F' may be formed using a variety of different materials and fabrication techniques, such as, chemical-vapor deposition (CVD), atomic layer deposition (ALD), physical vapor deposition (PVD) or plasma-enhanced versions of such processes. The thicknesses of the depicted layers may also vary, depending on the particular application. In one example, optical waveguide material layer 122 of structure 124 may be formed over isolation layer 116 and optical waveguide 112', via conventional processes, such as, for instance, wafer bonding or the like.

Figure 1G:
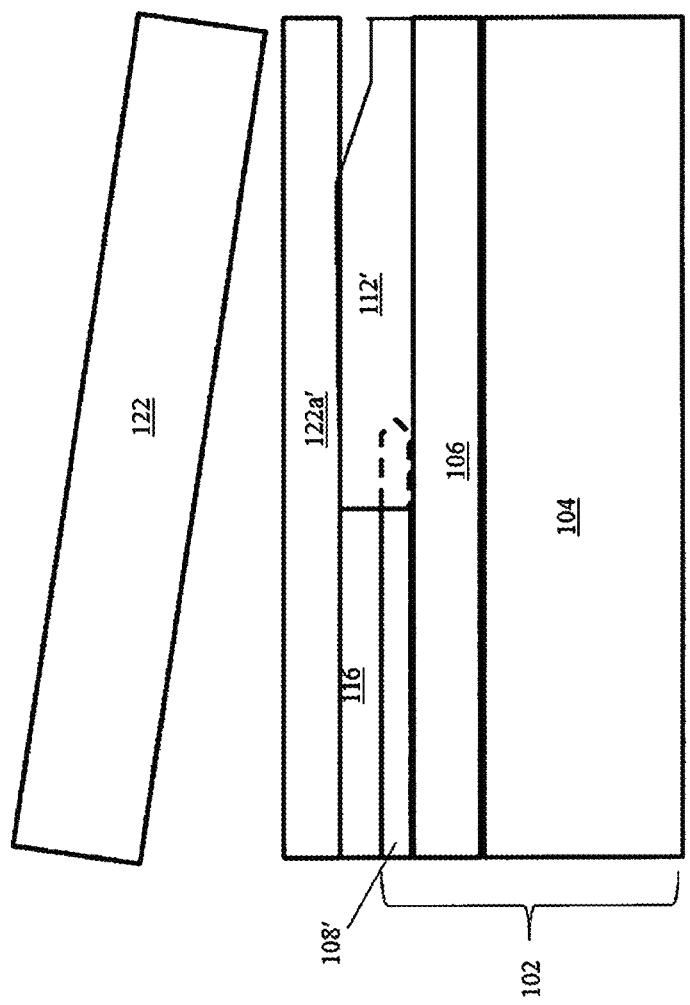
FIG. 1G is a cross-sectional elevational view of the intermediate structure of FIG. 1F with the optical waveguide layer thermally sliced.
Figure 1G:
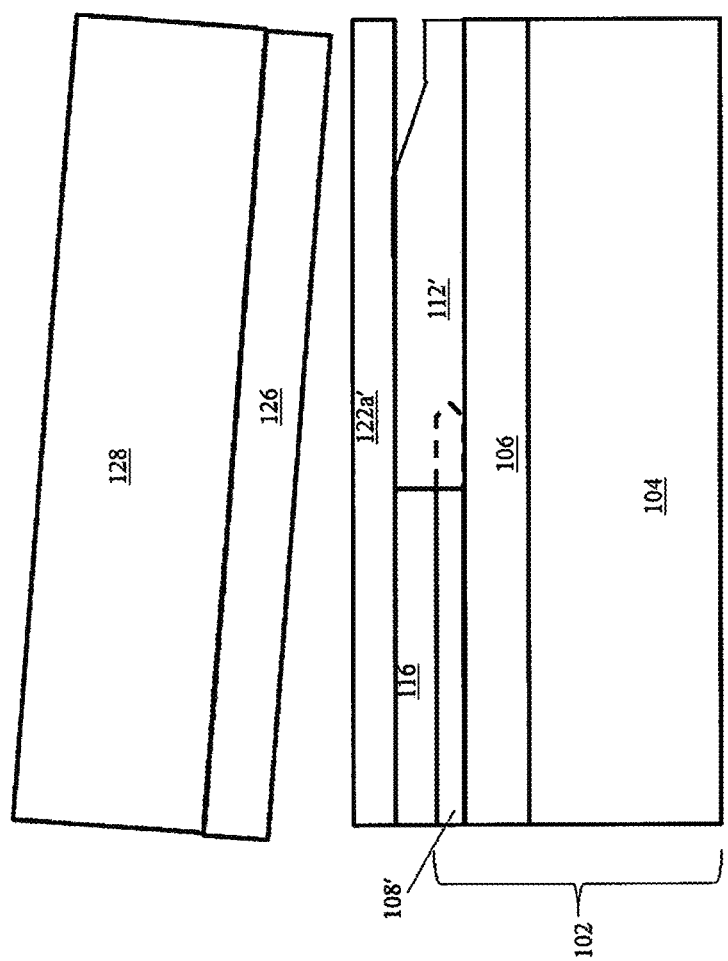

FIG. 1G depicts the structure of FIG. 1F after thermally slicing optical waveguide material layer 122 to substantially reduce a thickness of optical waveguide material layer 122, in accordance with one or more aspects of the present invention. By way of example, the structure may be subjected to a heating device, such as, furnace, oven or the like, so as to thermally slice optical waveguide material layer 122 along implanted region 122b (see FIG. 1F) which, for instance, results in an optical waveguide material layer (i.e., optical waveguide material layer 122a') having a reduced thickness. In one example, the reduced thickness of the optical waveguide material layer 122a' may be within a range of about 300 nm to about 700 nm. In a specific example, the thermal slicing process may be accomplished by exposing the structure to a temperature of about 220° C. for a time period of about 100 mins or more. Although not depicted in figures, one skilled in the art will understand that the thermal slicing of optical waveguide material layer 122 often results in non-planar upper surface of optical waveguide material layer 122a'.

In an additional, or an alternate embodiment, one or more chemical etching processes (i.e., backside substrate removal process) may be performed to selectively etch insulator layer 126 and semiconductor layer 128 of structure 124, leaving, for instance, optical waveguide material layer 122 disposed over isolation layer 116 and optical waveguide 122', as depicted in FIG. 1G'. Any suitable etching process, such as, isotropic wet etching or anisotropic dry etching processing, for example, reactive ion etching, may be employed to selectively remove insulator layer 126 and semiconductor layer 128 of structure 124. Although not critical to the invention, in one example, the thickness of optical waveguide material layer 122a' may be within a range of about 300 nm to about 700 nm.

Figure 1H:
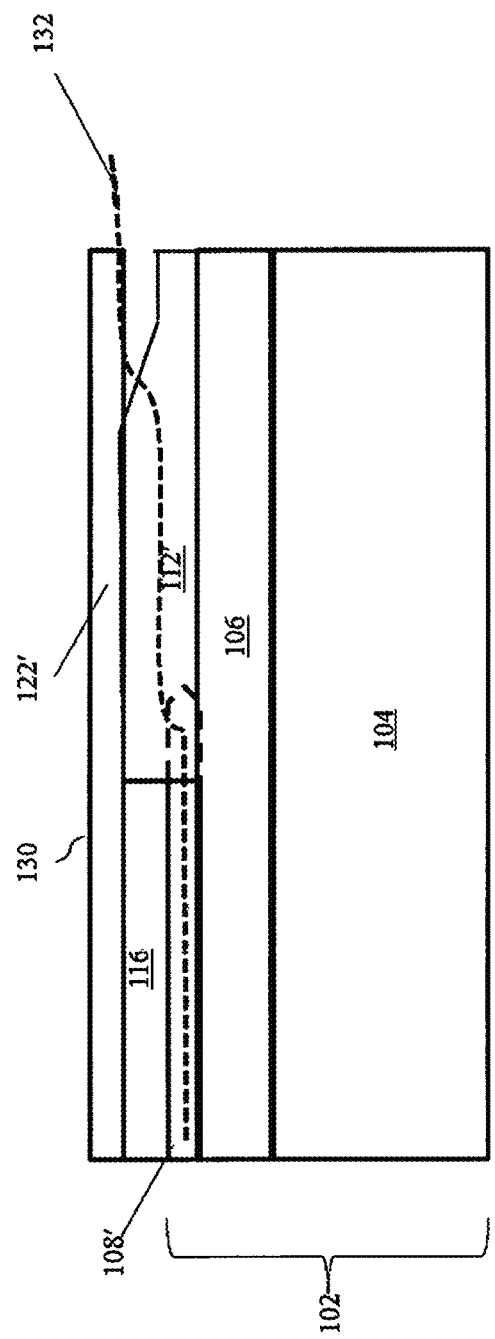
FIG. 1H is a cross-sectional elevational view of the intermediate structure of FIG. 1F with a non-selective chemical mechanical polish employed to provide a coplanar upper surface on the optical waveguide layer.

As illustrated in FIG. 1H, to reduce undesirable height variations, and thus provide a more coplanar upper surface 130, a non-selective chemical mechanical polish may be employed. The chemical-mechanical polishing, for instance, results in defining optical waveguide 122' that is vertically coupled to optical waveguide 108' through optical waveguide 112' disposed below, and directly contacting optical waveguide 122'. In one example, optical waveguide 122' (i.e., lithium niobate optical waveguide) may have a thickness within a range of about 300 nm to about 700 nm. In a specific example, optical waveguide 122' may have a thickness of about 300 nm.

Continuing with FIG. 1H, in one embodiment, the propagation of light through a resultant photonic integrated circuit has been studied using optical simulations from Lumerical Mode Solutions™, the results of which have been provided further below in FIGS. 3A-3E. As further confirmed by optical simulations depicted in FIGS. 3A-3E, the propagation of light 132 has been observed to transmit from optical waveguide 108' (see FIG. 3B) through its tapered end 110 into optical waveguide 112', and subsequently into optical waveguide (see FIG. 3E) through the tapered portion 114 of optical waveguide 112' (see FIG. 3D). For instance, FIG. 3A-3E present the simulations of how two set of tapers are used to couple light from pure silicon waveguide (i.e., optical waveguide 108') ((FIG. 3B) via a tapered portion (FIG. 3C)) and finally into the SiN/LN hybrid waveguide (FIG. 3D). Note that, each of the tapered end 110 of optical waveguide 108' and tapered portion 114 of optical waveguide 112', in one embodiment, have been carefully designed and optimized using Lumerical Mode Solutions™, and in order to have adiabatic optical mode transition. Further, as discussed above, while the tapered end 110 of optical waveguide 108' facilitates transitioning the optical mode from silicon waveguide 108' to silicon nitride (SiN) waveguide 112', the tapered portion 114 of optical waveguide 112' facilitates defining an optical mode distribution within the overlying lithium niobate waveguide 122'. Still further, the substantially similar refractive indices of each of the rib-loaded optical waveguide 112' and optical waveguide 122' facilitate defining lateral confinement of a lithium niobate optical waveguide 122'.

Figure 1I:
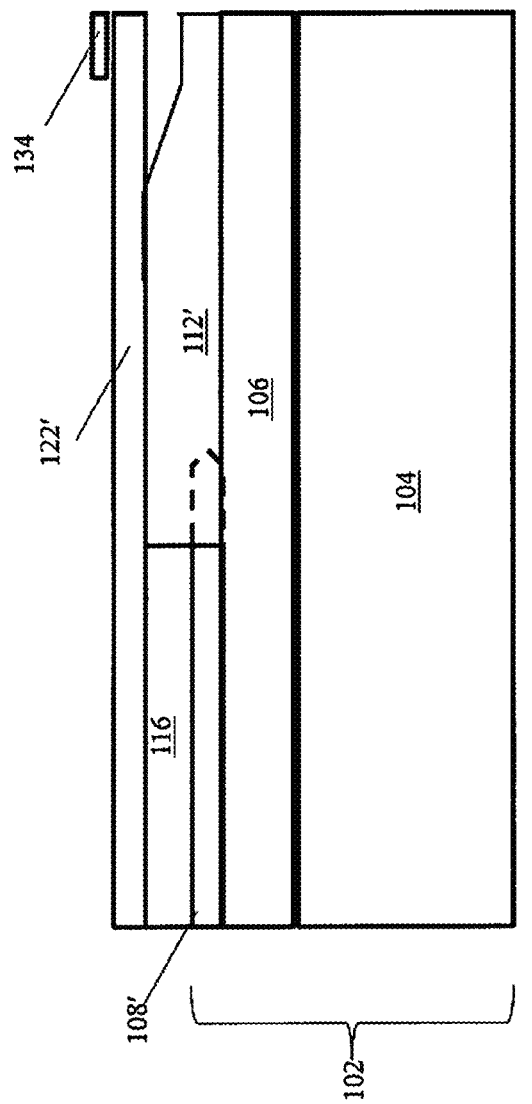
FIG. 1I is a cross-sectional elevational view of the intermediate structure of FIG. 1H with one or more electrodes formed over the optical waveguide via conventional deposition processes.

As illustrated in FIG. 1I, subsequent fabrication processing proceeds, via conventional deposition processes, to form one or more electrodes 134 over optical waveguide 122'. As depicted, each of these electrode(s) 134 may be formed such that the underlying silicon nitride optical waveguide 112' is straddled (see FIG. 3B), thereby enhancing the performance of the resultant photonic integrated circuit.

Figure 2A:
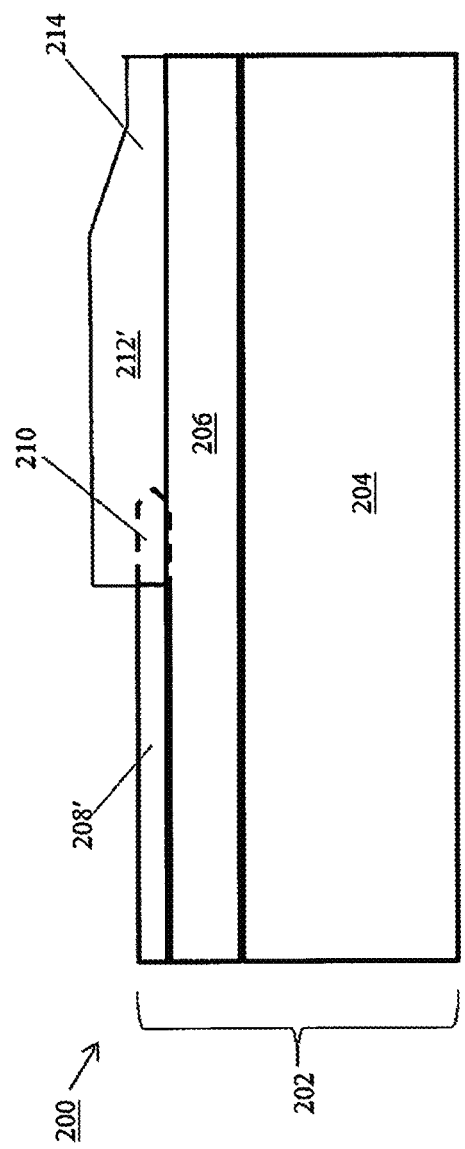
FIG. 2A is a cross-sectional elevational view of an illustrative embodiment of an intermediate structure after patterning the optical waveguide material to form an optical waveguide.

By way of example, FIGS. 2A-2F depict another embodiment of a method for fabricating a photonic integrated circuit having one or more optical waveguides via, for instance, a back-end-of-the line fabrication processing, in accordance with one or more aspects of the present invention. As illustrated, the intermediate structure 200 of FIG. 2A is substantially identical to that of FIG. 1D, described above and, in one embodiment, may be obtained using the fabrication processing steps employed to obtain the structure of FIG. 1D. Note that, in one embodiment, the materials of various layers of FIG. 2A are similar or identical to the materials of the layers of FIG. 1D.

Figure 2B:
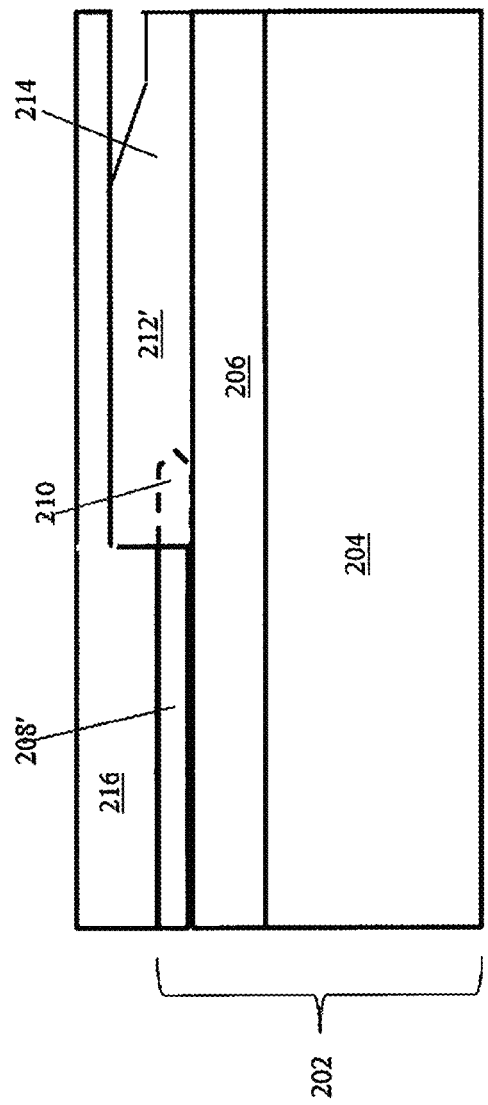
FIG. 2B is a cross-sectional elevational view of the intermediate structure of FIG. 2A after deposition of an isolation layer over an exposed portion of the optical waveguide.

FIG. 2B depicts the structure of FIG. 2A after deposition of an isolation layer 216 over an exposed portion of optical waveguide 208', in accordance with one or more aspects of the present invention. In one embodiment, isolation layer 216 may include, or may be fabricated of, a polymer material, such as, benzocyclobutene (BCB) or the like, and may be deposited using a variety of techniques, such as, for example, spin-on coating or the like. The thickness of isolation layer 216 may be (in one example) sufficient to allow subsequent planarization of the structure, for instance, so as to leave a layer of the isolation material that extends above an upper surface of optical waveguide 212'. The thickness of isolation layer 216 extending above optical waveguide 212', in one example, may be within a range of about 100 nm to about 500 nm.

Figure 2C:
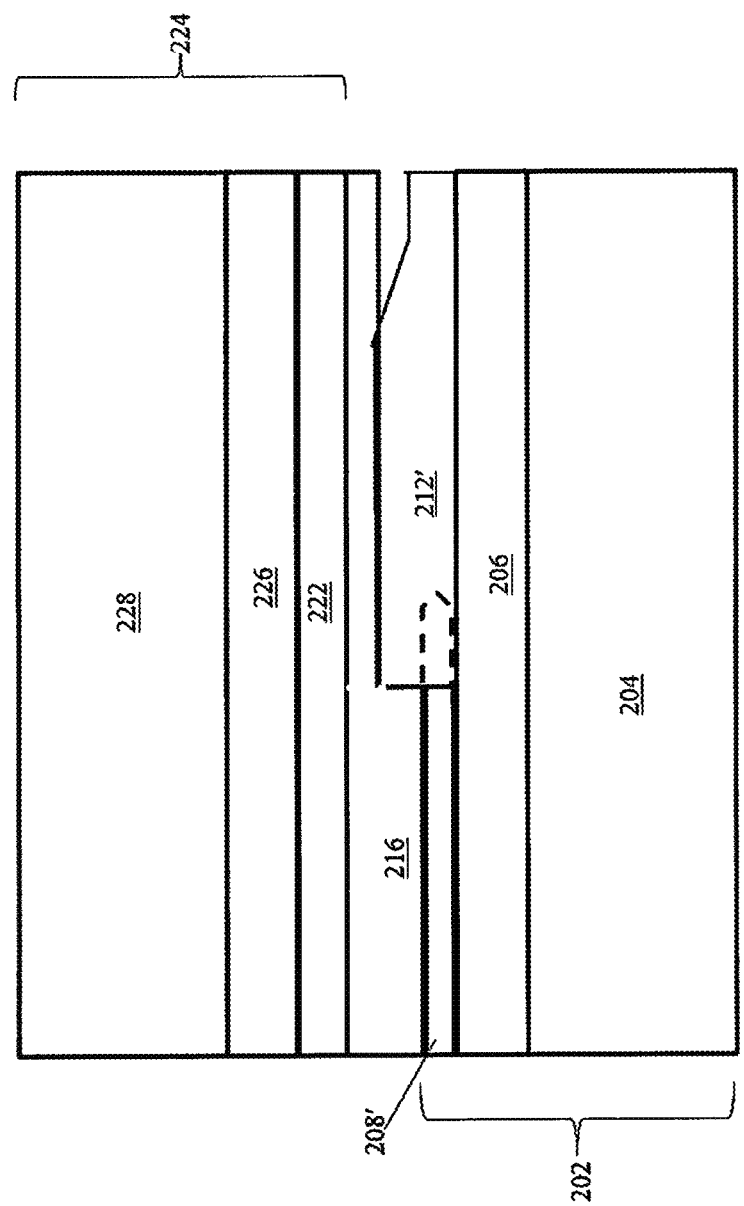
FIG. 2C is a cross-sectional elevational view of the intermediate structure of FIG. 2B after formation of the optical waveguide material over the isolation layer.

FIG. 2C depicts the structure of FIG. 2B after formation of optical waveguide material layer 222 over isolation layer 216, in accordance with one or more aspects of the present invention. The material of optical waveguide material layer 222 may be similar or identical to the material of optical waveguide material layer of FIGS. 1F & 1F'. As depicted and as described above, optical waveguide material layer 222 may be, or may include, a material that has a refractive index that is substantially similar to a refractive index of optical waveguide 212'. Examples of optical waveguide material layer 222 may include, but are not limited to, lithium niobate ($LiNbO_3$), aluminum nitride (MN) and the like.

Continuing with FIG. 2C, and in one embodiment, optical waveguide material layer 222 may be deposited over isolation layer 216, for instance, by disposing a structure 224 onto which optical waveguide material layer 222 has been attached. By way of example, structure 224 includes, for instance, a semiconductor substrate 228, an insulator layer 226 disposed over semiconductor layer 228, and optical waveguide material layer 222 disposed over insulator layer 228. Although not critical to the invention, semiconductor substrate 228 may include, or may be fabricated of, a semiconductor material, such as, silicon, while insulator layer 226 may include, or may be fabricated of an insulating material, such as, silicon oxide ($SiO_2$). These layers of structure 224 of FIG. 1F' may be formed using a variety of different materials and fabrication techniques, such as, chemical-vapor deposition (CVD), atomic layer deposition (ALD), physical vapor deposition (PVD) or plasma-enhanced versions of such processes. The thicknesses of the depicted layers may also vary, depending on the particular application. In one example, optical waveguide material layer 222 of structure 224 may be deposited over isolation layer 216, via conventional processes, such as, for instance, wafer bonding or the like.

Figure 2D:
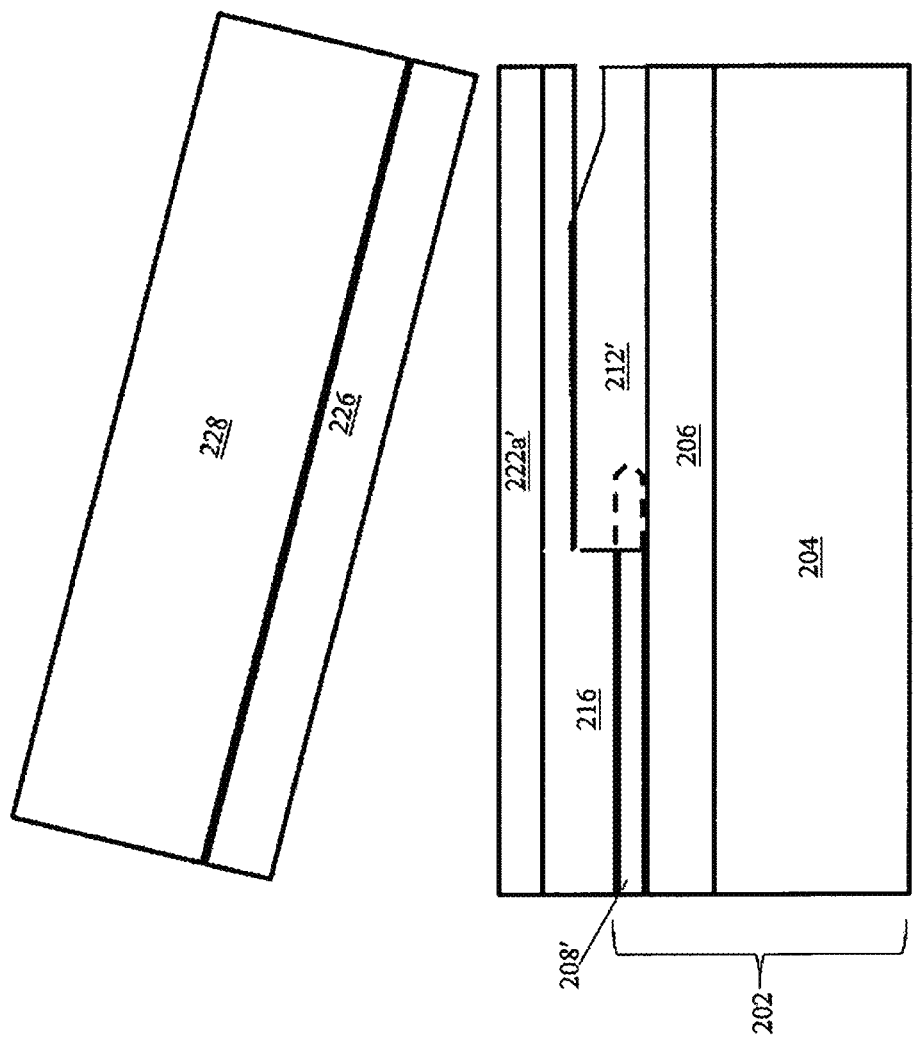
FIG. 2D is a cross-sectional elevational view of the intermediate structure of FIG. 2C after the insulator layer and semiconductor layer of the structure is selectively etched leaving the optical waveguide material layer disposed over the isolation layer.

One or more chemical etching processes (i.e., backside substrate removal process) may be performed to selectively etch insulator layer 226 and semiconductor layer 228 of structure 224, leaving, for instance, optical waveguide material layer 222 disposed over isolation layer 216, as depicted in FIG. 2D. Any suitable etching process, such as, isotropic wet etching or anisotropic dry etching processing, for example, reactive ion etching, may be employed to selectively remove insulator layer 226 and semiconductor layer 228 of structure 224 (see FIG. 2C). Although not critical to the invention, in one example, the thickness of optical waveguide material layer 222a' may be within a range of about 300 nm to about 700 nm.

Figure 2E:
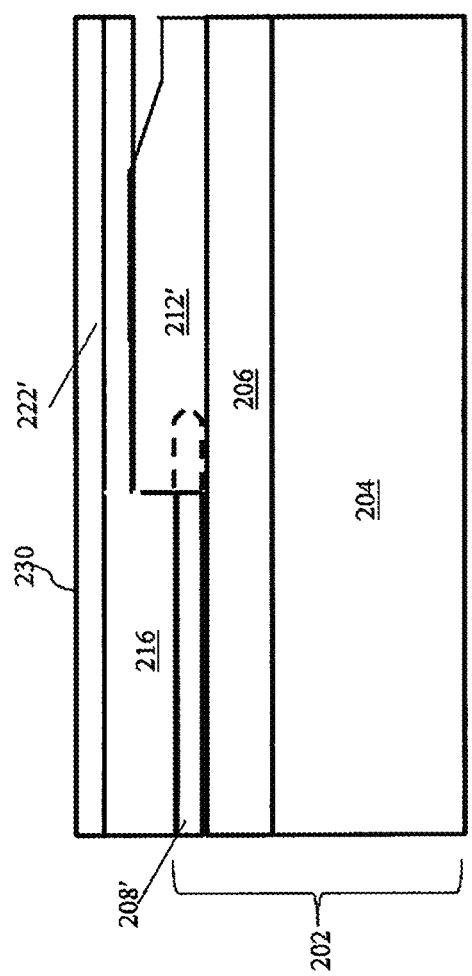
FIG. 2E is a cross-sectional elevational view of the intermediate structure of FIG. 2D after a non-selective chemical mechanical polish is employed, providing a coplanar upper surface on the optical waveguide layer.

As illustrated in FIG. 2E, to reduce undesirable height variations, and thus provide a more coplanar upper surface 230, a non-selective chemical mechanical polish that is similar or identical to the chemical mechanical polish described above in connection with FIG. 1H may be employed. The chemical-mechanical polishing, for instance, results in defining optical waveguide 222'. Advantageously, optical waveguide 222' is vertically coupled to optical waveguide 208' through optical waveguide 212' disposed below optical waveguide 222', although isolation layer 216 facilitates separating the optical waveguide 208' from the overlying optical waveguide 212'. Note that, as depicted, the thickness of isolation layer 216 between optical waveguide 208' and optical waveguide 222' is sufficiently thick so as to prevent optical coupling between the two optical waveguides, while allowing optical coupling between the optical waveguide 212' and optical waveguide 222'.

Figure 2F:
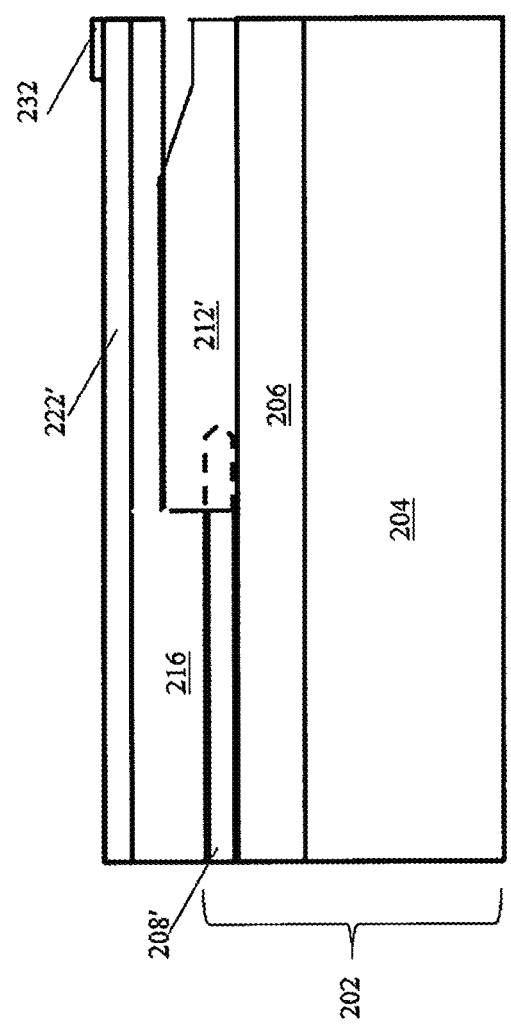
FIG. 2F is a cross-sectional elevational view of the intermediate structure of FIG. 2E with one or more electrodes formed over the optical waveguide via conventional deposition processes.

As illustrated in FIG. 2F, subsequent fabrication processing proceeds, via conventional deposition processes, to form one or more electrodes 232 over optical waveguide 222'. As depicted, and discussed above in connection with FIG. 1I, each of these electrode(s) 232 may be formed such that the underlying silicon nitride optical waveguide 212' is straddled (see FIG. 3B), thereby enhancing the performance of the resultant photonic integrated circuit.

Figure 4A:
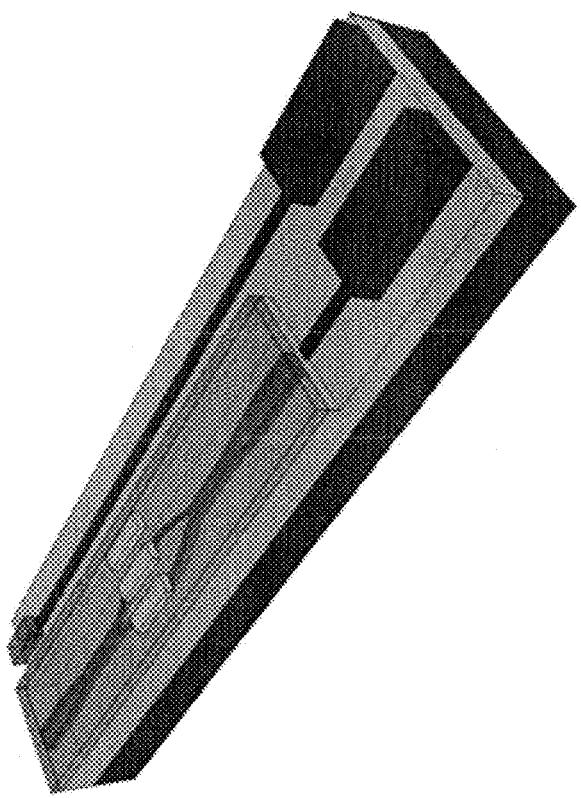
FIG. 4A is a perspective view of a schematic representation of an illustrative embodiment of a circuit structure of the intermediate structure of FIG. 1I or 2F after subsequent fabrication processing.
Figure 4B:
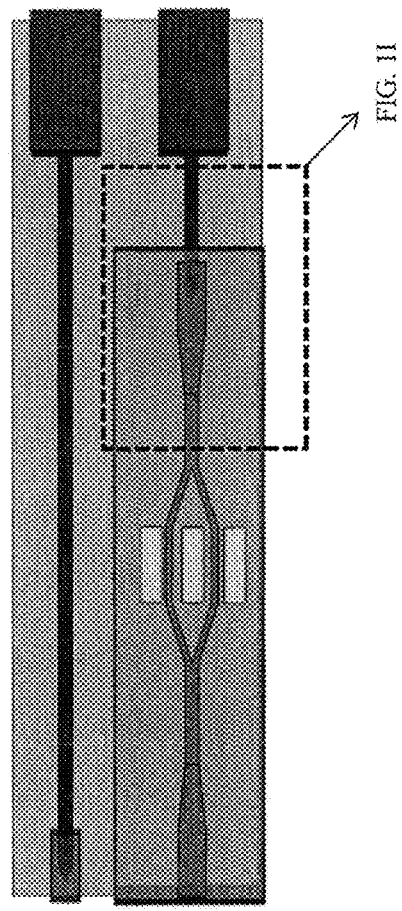
FIG. 4B is a top view of a schematic representation of an illustrative embodiment of a circuit structure of the intermediate structure of FIG. 1I or 2F after subsequent fabrication processing.

Although not critical to the invention, FIGS. 4A & 4B depict a resultant circuit structure of the structures depicted in either FIG. 1I or FIG. 2F, after subsequent fabrication processing. By way of example, subsequent fabrication processing, in one embodiment, may include, fabrication of conventional elements, such as, mode converters (such as, couplers), lasers (such as, III-V lasers), and photodetectors (such as, germanium (Ge) photodetectors. Further, the fabrication processes described herein can be utilized in the fabrication of devices, such as, electro-optic modulators, as well as for a variety of applications ranging from non-linear optics (e.g., second-harmonic generation) to quantum optics (e.g., spontaneous parametric down conversion).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprise" (and any form of comprise, such as "comprises" and "comprising"), "have" (and any form of have, such as, "has" and "having"), "include" (and any form of include, such as "includes" and "including"), and "contain" (any form of contain, such as "contains" and "containing") are open-ended linking verbs. As a result, a method or device that "comprises", "has", "includes" or "contains" one or more steps or elements. Likewise, a step of method or an element of a device that "comprises", "has", "includes" or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts and equivalents of all means or step plus function elements in the claims below, if any, are intended to include any structure, material or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of one or more aspects of the invention and the practical application, and to enable others of ordinary skill in the art to understand one or more aspects of the present invention for various embodiments with various modifications as are suited to the particular use contemplated.

What is claimed is:

1. A photonic integrated circuit having an input end and an output end, the photonic integrated circuit comprising:
   a substrate having a top surface;
   a first optical waveguide having a distal end portion, that extends only partly from the input end across the top surface of the substrate, the first optical waveguide having a first propagation path;
   a third optical waveguide having a top surface, located laterally adjacent the first optical waveguide and partially disposed directly adjacently over the distal end portion of the first optical waveguide, the third optical waveguide having a third propagation path that is at least partially common with the first propagation path; and
   a second optical waveguide disposed directly adjacent the top surface of the third optical waveguide, having a second propagation path,
   wherein the second propagation path is wholly, vertically displaced from, and not common with, the first propagation path.

2. The photonic integrated circuit of claim 1, wherein the first optical waveguide has a tapered end, wherein the tapered end of the first optical waveguide is disposed, at least in part, within the third optical waveguide.

3. The photonic integrated circuit of claim 2, wherein the third optical waveguide has a distal end including a tapered portion extending to the output end.

4. The photonic integrated circuit of claim 3, wherein the tapered portion of the third optical waveguide is laterally, linearly aligned with the tapered end of the first optical waveguide.

5. The photonic integrated circuit of claim 3, wherein a refractive index of the second optical waveguide is matched to a refractive index of the third optical waveguide, which defines a lateral confinement of a propagating light mode in the second optical waveguide.

6. The photonic integrated circuit of claim 3, wherein the second optical waveguide is a lithium niobate (LiNbO3) waveguide.

7. The photonic integrated circuit of claim 6, wherein the LiNbO3 waveguide has a thickness in the range between 300 nm to 700 nm.

8. The photonic integrated circuit of claim 3, further comprising a plurality of electrodes operationally coupled to the second optical waveguide, wherein the plurality of the electrodes straddle the tapered portion of the third optical waveguide.

9. The photonic integrated circuit of claim 3, wherein an output end of the second optical waveguide is disposed over the tapered portion of the third optical waveguide.

10. The photonic integrated circuit of claim 3, wherein the first optical waveguide is a Si waveguide, the third optical waveguide is one of a SiN and a Si3N4 waveguide, and the second optical waveguide is a LiNbO3 waveguide.

11. The photonic integrated circuit of claim 10, wherein the LiNbO3 waveguide has a thickness in the range between 300 nm to 700 nm.

12. The photonic integrated circuit of claim 10, wherein the LiNbO3 waveguide is integrated in the photonic integrated circuit in a back-end-of-the-line (BEOL) standard Si foundry process.

13. The photonic integrated circuit of claim 1, further comprising a non-wave-guiding layer disposed intermediate an exposed portion of the first optical waveguide and a portion of the second optical waveguide.

14. The photonic integrated circuit of claim 13, wherein a top surface of the non-wave-guiding layer and the top surface of the third optical waveguide are coplanar.

15. The photonic integrated circuit of claim 1, wherein the first and third waveguides are rib-loaded waveguides.

* * * * *